Sept. 12, 1933.  T. SUZUKI  1,926,923
PROJECTING SCREEN
Filed Feb. 6, 1928
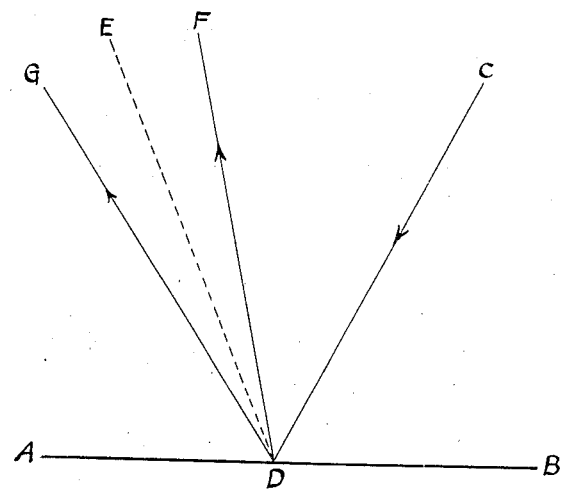
Inventor:
T. Suzuki
By Attorneys:
Marks & Clerk Patented Sept. 12, 1933

1,926,923

UNITED STATES PATENT OFFICE 1,926,923

PROJECTING SCREEN

Tsuneo Suzuki, Tokyo, Japan, assignor to Zaidan Hojin Rikagaku Kenkyujo, Tokyo, Japan Application February 6, 1928, Serial No. 252,356, and in Japan March 31, 1927

2 Claims. (Cl. 88—24)

This invention relates to a new film surface constructed by arranging lamellar or scaly crystals adhered evenly and uniformly on a light absorbing surface, and also to a process of making the same. The object of the invention is to provide a new film surface having a property discovered by the inventor, i. e., a property characterized by showing the phenomenon of diffuse reflection only to directions which are limited within a conical surface having the direction of reflected ray, corresponding to the incident ray, referred to the film surface as an optical surface, as the axis and subtending a certain angle with it. When this film surface is applied, for example, to reflect a projected picture, it is able to show the picture to the attendants, not influenced by the presence of other lights coming from directions comparatively distant from that of projecting apparatus.

The accompanying drawing illustrates the action of diffuse reflection made by the new film surface according to the invention.

In the figure, let AB be a film surface having black, brown, dark blue, or dark violet colors etc., absorbing much light, on which lamellar or scaly crystals are made to adhere evenly and uniformly arranged. Then a beam of light (very narrow bundle of light) is projected from a light source C to a point D on the film surface AB. Now, if the surface AB be an optical surface, i. e., a mirror, the beam of light will be reflected in the direction DE, but in the case of the above stated film surface, the beam of light is reflected diffusely to several directions limited by an approximately conical surface containing DF and DG. If the eyes are brought to any point within this cone, they will see a light spot at D.

The property like this, to make diffuse reflection in a limited space, can also be observed in more or less degree in the case of a metallic surface provided with small convex and concave dots, as the matt surface of metals. The inventor discovered that dark surfaces covered with lamellar or scaly crystals evenly and uniformly arranged have the same property in a very marked degree.

When a beam of light is reflected by this film surface, the brightness of the spot at D is maximum when it is viewed on the line DE, and decreases gradually when the position of eye shifts towards F or G and at last nothing more can be seen.

The angles subtended by DE and DG or DE and DF are different according to the definition of what visible is, but practically the limit of visibility, referring to a certain light source, without much troubling the eyes can be easily controlled from 10 degrees to 40 degrees by changing the quantity of crystals applied on the surface. For the sake of convenience, let use call that angle EDF (or EDG) the angle of diffuse reflection, and the conical surface containing the lines DG and DF the cone of diffuse reflection.

Now, assuming that a bundle of light from C having a larger angle is projected upon the film surface AB, let CD be the central ray of that bundle, and let DE be the path of the reflected central ray if the surface AB be a mirror. Now the eye is brought on the line DE and the surface AB is viewed. All rays coming from their light source C make diffuse reflection each in its cone of diffuse reflection; and as a result, an ellipse is seen on the surface, the brightness of which being a maximum at the central part of the ellipse, and decreasing towards the brim. The visual angle of the major diameter of that ellipse is smaller than the double of the angle of diffuse reflection. In the same way, many bundles of light having larger angles from many light sources other than C, are made to project, at the same time, upon the film surface AB. Then the eye can see many ellipses at different parts of this surface; and the centres of these ellipses do not fall at the same point. If the light sources are far enough apart, or the angle of diffuse reflection is small enough, the eye can see these ellipses as not overlapping each other.

Now a bundle of light is projected upon this film surface by using any projecting apparatus, and the image is focussed upon it. Then this image can be seen clearly when the eye is within the cones of diffuse reflection of rays composing this bundle of light. If other bundles of light from other light sources strike the film surface at the same time from directions quite apart from that of projecting apparatus, many ellipses appear at different places on the surface, and they will not overlap the image from the projecting apparatus. If the size of the surface is limited to that which is only necessary for projecting the image, and using a film surface whose angle of diffuse reflection is well controlled, it is practically possible to show the image in the presence of many light sources besides the projecting apparatus, such as electric lamps, window light, and even in a very brightly lighted room without any influence upon the image.

With a film surface having an angle of diffuse reflection small enough, it is possible to project a picture even out-doors in the day time.

In the following example, the process of making the new film surface is explained:

A dark colored plate such as colored glass plate is covered with a thin layer of gelatine by any known method. Next, crystals such as ammonium manganous phosphate or ammonium cobaltous phosphate, or their mixed crystals, obtained by suitable method are suspended in water in a vat. Then the water in the vat is well agitated, the prepared plate is sunk down in it quickly before the suspended crystals begin to settle to the bottom. To prevent the rotatory and wave motions of water which cause the crystals to heap at certain places during the precipitation, thus disturbing their even and uniform propagation over the surface of plate, a rough grid made of wood or metal is sunk down into the water taking care not to touch the plate. As soon as the rotatory and wave motions of water are subsided, the grid is slowly taken away, and the crystals are allowed to precipitate upon the plate. After they are all precipitated, the supernatant water is removed by means of siphon or other suitable arrangements quite slowly not disturbing the crystals in the least. It is better to give a little inclination to the plate, as then the draining off of the water takes place more easily and quickly. In this way, a film surface, a surface covered with lamellar or scaly crystals evenly and uniformly arranged, can easily be produced. After draining off all the water, on drying the crystals will stick to the plate by the action of the gelatine. Further to prevent the mechanical wearing of the surface it is coated with any transparent varnishes, lacs, collodion, gelatine or gums. To harden the gelatine coating, formalin or chromium compounds may also be used.

The manganous and cobaltous ammonium phosphates mentioned above are both lamellar crystals having reflecting property. They are very easy to prepare and are more suitable for this purpose than natural crystal such as mica. They are insoluble in water.

Manganous ammonium phosphate (phosphate of manganous oxide and ammonia) is described in "Handbook of Chemistry" by Leopold Gmelin, translated by Harry Watts, MDCCCL, London, pages 231–232, and cobaltous ammonium phosphate is described in "Ladenburg's Handworterbuch der Chemie" see page 597 (1877) Breslay.

The film surface made in this way looks dark or black, if it is viewed rightly with dark background (the back of one who looks at the surface being dark). If an image is projected upon it, it can be seen very clearly even in presence of windows or electric lamps not too near to the projecting apparatus. Such presence of other light sources than the projecting apparatus exerts least influence upon the image by the reason which has hitherto been stated. On using the quantity of ammonium manganous phosphate obtained from 3 to 4 grams of crystallized manganous sulphate, per square meter of the film surface, the angle of diffuse reflection amounts to about 10 degrees; that from 20 grams of crystallized manganous sulphate per square meter will give a film surface having the angle of diffuse reflection of about 30 degrees.

Instead of dark colored glass plate, ordinary glass plate can be used which is coated with gelatine containing pigments such as lamp black, aniline black, Prussian blue, Turnbull's blue, or ultramarine, or some colloidal coloring matters as nigrosine, thus changing the surface of it much absorptive to the light. If the quantity of the pigments of coloring matters is controlled so as to give semi-transparent gelatine coating, the finished plate will give a fascinating image when it is projected upon the film side, and properly illuminated at the back side. The shade of the image shows beautiful dark tints according to the pigments or coloring matters used. Such a plate can be used for window pane and when projected upon it, the charming picture is enough to please the attendants.

Instead of gelatine, glue, casein, starch paste, gums, and agar-agar can be used; and instead of glass plate, any metallic plates, or wooden plate soaked with any water-proofing material may be used. Further stuffs expanded on a frame, soaked with lac or rubber solution so as to make it more smooth and water proof, can also be used.

To make the crystals adhere evenly and uniformly arranged upon a surface, the precipitation from water as described just now, is the best method. But carefully painting the crystals mixed with suitable paste, or printing with an ink containing the crystals, or blowing the crystals upon the pasted surface will all give tolerably good result.

Besides the crystals of ammonium manganous phosphate and ammonium cobaltous phosphate, other crystals such as mica, stannic sulphide, or any other lamellar or scaly crystals which are permanent in the air can also be used with pretty good result.

On using this film surface for projection of magic lantern or cinematographic pictures, there is no necessity of using dark rooms, or selecting night time. The projection can easily be made in day light even in out-door place, and at night in a place where strongly illuminated by lamps, thus making a new epoch in disciplinal and educational sense.

On using this film surface for projection, the images from projecting apparatus can be used as decorations in or out of the room.

I claim:

1. A projecting screen comprising a base, a light absorbing surface and an adhering layer of superimposed lamellar crystals, said crystals being selected from the group consisting of ammonium manganese phosphate and ammonium cobalt phosphate.

2. A projecting screen comprising a base, a light absorbing surface and an adhering layer of superimposed lamellar crystals, said crystals being selected from the group consisting of ammonium manganese phosphate and ammonium cobalt phosphate, and a coating thereon giving a diffused reflection of from 10° to 30°.

TSUNEO SUZUKI.